United States Patent
Kerul, Jr.

(10) Patent No.: US 6,499,868 B1
(45) Date of Patent: Dec. 31, 2002

(54) VANITY MIRROR LAMP ASSEMBLY WITH REPLACEABLE BATTERY

(75) Inventor: Joseph A. Kerul, Jr., Canton, MI (US)

(73) Assignee: Prestolite Wire Corporation, Southfield, MI (US)

( * ) Notice: Subject to any disclaimer, the term of this patent is extended or adjusted under 35 U.S.C. 154(b) by 38 days.

(21) Appl. No.: 09/764,008

(22) Filed: Jan. 17, 2001

Related U.S. Application Data
(60) Provisional application No. 60/176,597, filed on Jan. 18, 2000.

(51) Int. Cl.$^7$ .............................................. F21W 101/02
(52) U.S. Cl. ...................................... 362/492; 362/511
(58) Field of Search ............................... 362/492, 511, 362/551, 521

(56) References Cited

U.S. PATENT DOCUMENTS

| | | | |
|---|---|---|---|
| 3,926,470 A | * 12/1975 | Marcus .................... | 362/492 X |
| 4,710,856 A | * 12/1987 | Cheung ..................... | 362/492 |
| 4,734,831 A | 3/1988 | Keyser et al. ................ | 362/74 |
| 4,751,618 A | * 6/1988 | Iacovelli ..................... | 362/492 |
| 4,984,137 A | 1/1991 | Maemura ..................... | 362/74 |
| 5,274,532 A | * 12/1993 | Gabas .................... | 362/492 X |
| 5,442,340 A | 8/1995 | Dykema ................ | 340/825.22 |
| 5,479,155 A | 12/1995 | Zeinstra et al. ........ | 340/825.22 |
| 5,575,552 A | 11/1996 | Faloon et al. ............... | 362/83.1 |
| 5,583,485 A | 12/1996 | Van Lente et al. .......... | 340/525 |
| 5,596,316 A | 1/1997 | Honeck .................... | 340/825.3 |
| 5,614,885 A | 3/1997 | Van Lente et al. .......... | 340/525 |
| 5,614,891 A | 3/1997 | Zeinstra et al. ........ | 340/825.22 |
| 5,661,804 A | 8/1997 | Dykema et al. .............. | 380/21 |
| 5,686,903 A | 11/1997 | Duckworth et al. ... | 340/825.22 |
| 5,699,054 A | 12/1997 | Duckworth ............ | 340/825.22 |
| 5,699,055 A | 12/1997 | Dykema et al. ........ | 340/825.22 |
| 5,708,415 A | 1/1998 | Van Lente et al. .......... | 340/525 |
| 5,903,226 A | 5/1999 | Suman et al. .......... | 340/825.69 |

FOREIGN PATENT DOCUMENTS

| | | |
|---|---|---|
| FR | 2 741 017 A1 | 5/1997 |
| GB | 2277620 | 2/1994 |
| GB | 2305281 | 2/1997 |
| GB | 2305282 | 2/1997 |
| JP | 2689078 | 12/1994 |

OTHER PUBLICATIONS

Patent Abstracts of Japan, Publication No. 09039634, Publication Date Oct. 2, 1997, Title Vanity Mirror, Inventor Yamana Toru.
International Search Report, 2 pages.
Derwent English Abstract for FR 2 741 017 –A1.

* cited by examiner

Primary Examiner—Laura K. Tso
(74) Attorney, Agent, or Firm—Radar, Fishman & Grauer PLLC

(57) ABSTRACT

A sun visor includes a visor assembly having an illumination device. The visor assembly further includes a trim bezel tray, backplate, and lamp/mirror lid. The trim bezel tray has a battery holder and at least one receiving portion molded as an integral part of the bezel. Access to the trim bezel tray is made possible by hingedly opening the trim bezel tray and backplate of the visor. A replaceable battery is placed within the battery holder. In a preferred embodiment, the illumination device includes an illumination source and a lightpipe with a lens attached to each end. The lightpipe assembly eliminates wiring from the installation and the replaceable battery eliminates the need for a remote power source. In another embodiment, the illumination device includes at least one illumination source positioned in the receiving portions of the bezel. The illumination source is in communication with the battery through electrically conductive wires.

17 Claims, 2 Drawing Sheets

VANITY MIRROR LAMP ASSEMBLY WITH REPLACEABLE BATTERY

This application claims benefit of Provisional Ser. No. 60/176,2000 filed Jan 18, 2000.

BACKGROUND OF THE INVENTION

1. Field of the Invention

The invention relates to a sun visor vanity mirror lamp assembly, and more particularly to a vanity mirror lamp and lightpipe or light emitting diodes with a replaceable battery as a power source for illumination. This application claims priority from U.S. Provisional Application No. 60/176,597, filed Jan. 18, 2000, the entire contents of which are incorporated in their entirety.

2. Description of the Related Art

It is common in the interior design of automobiles to incorporate sun visors for the driver and passenger riding in the front seat. The visors are mounted to the ceiling of a vehicle near the upper corners of a windshield by an arm and socket. The mobility of the socket and arm is limited to pivoting the visor down to block sunlight from entering into the vehicle from the windshield, or, to pivoting axially to prevent sunlight from entering the vehicle from the side window nearest the windshield.

For most of the visors in vehicles today, a vanity mirror has been added as an extra feature to the sun visor. For use of the mirror at night, lamps are mounted on each side of the mirror, and in some cases, a tuner can dim the lamps. By design, the lamps are normally illuminated when the visor is positioned for use of the mirror, and when the mirror guard is deployed upward, triggering the lamps to illuminate.

The method for installing a visor does not require more than inserting and mounting the arm and socket into the ceiling of the vehicle. However, by incorporating the lamps, wiring and a remote power source must be considered. The use of a remote power source increases the likelihood of connection problems during manufacturing resulting in a decrease in reliability during use. Also, if one of the lamps bums out and must be replaced, at least a portion of the visor must be disassembled so access can be gained for removal of the burned out lamp and replacement of a new one.

SUMMARY OF THE INVENTION

The aforementioned difficulties dealing with the installation and maintenance of vanity mirrors in overhead visors can be significantly eliminated and overcome by the present invention of a vanity mirror lamp assembly with a replaceable battery. In accordance with an embodiment of the present invention, a visor assembly is provided that eliminates wiring from the installation process of the vehicle by utilizing a lightpipe powered by a local replaceable battery. These two advantages promote remote installation and maintenance by a consumer that is currently prohibited in the current assembly of vanity mirror visors.

The lightpipe is known in the art to split incoming light into a series of bands at the output based on the angle of the incoming light. When a beam of light reaches a boundary between two transparent things, three things can happen: all of it may pass through the boundary, all or some of it may bounce back off the boundary, and some may go through. The result depends on the angle at which the light meets the boundary.

The shallower the angle, the more the light will reflect (bounce) off the surface; the steeper the angle, the more light will pass through the boundary. When the angle is below a critical level, all the light reflects off the boundary.

The lightpipe assembly in the present invention is comprised of a lightpipe with a lens attached to each end. The visor assembly is comprised of a trim bezel tray, backplate, and lamp and mirror lid. The trim bezel tray has a battery holder and lamp socket embodiment molded as an integral part of the bezel. Molded sockets for intercepting the lens of the lightpipe are also inclusive to the tray. Access to the trim bezel tray is made possible by hingedly opening the trim bezel tray and backplate of the visor. Remote installation of the lightpipe assembly into the trim bezel tray is achieved by snap-fitting the lightpipe assembly into the lens sockets.

In another embodiment, a visor assembly is provided that includes a trim bezel tray having two molded sockets that each receive an illumination source, such as a light emitting diode. The trim bezel tray further includes a battery holder in communication with each illumination source via a pair of electrically conductive wires.

Various additional aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
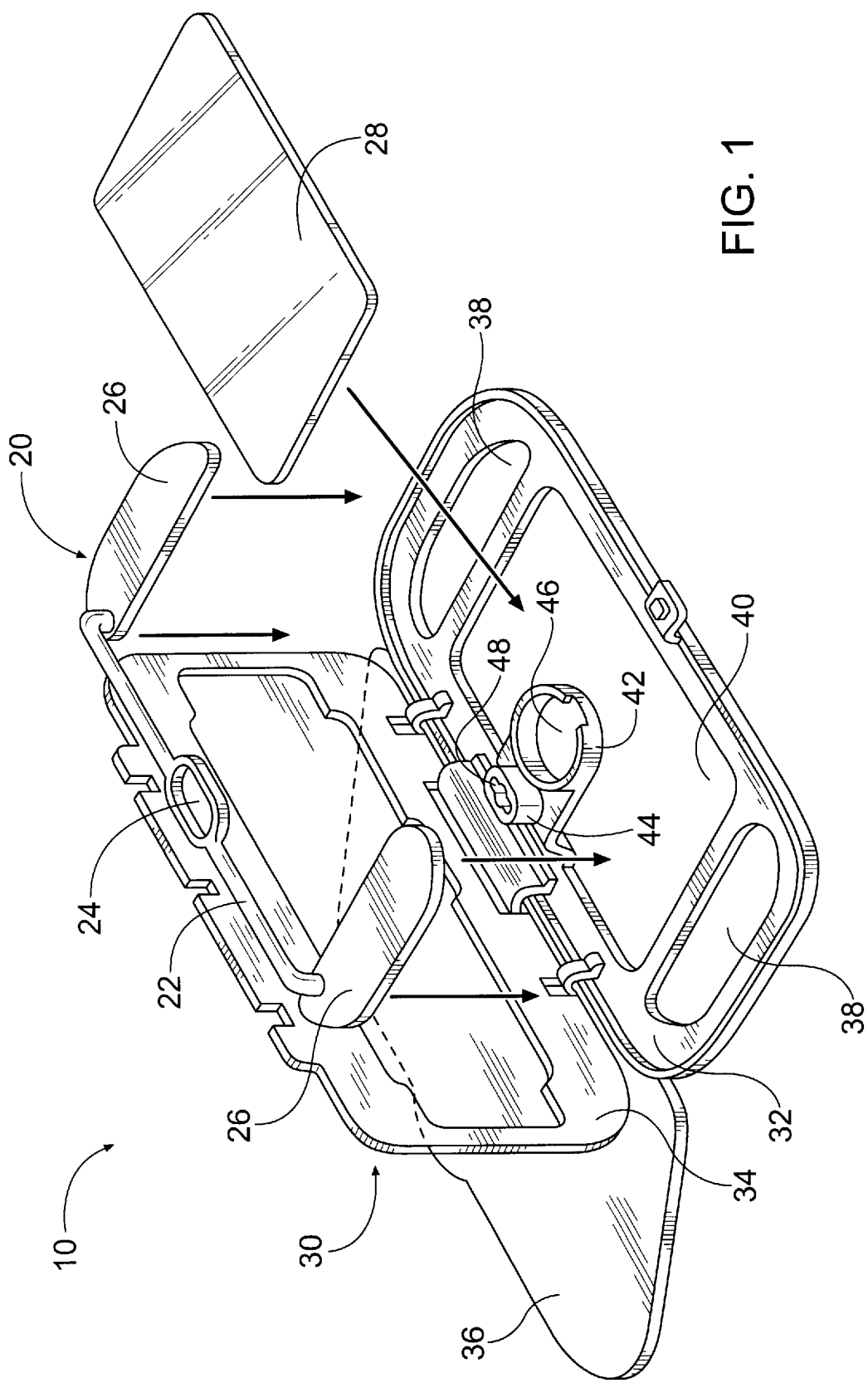
FIG. 1 is a transverse sectional view of an embodiment of the present invention showing the relationship between the visor assembly and lightpipe assembly.

Referring to FIG. 1, a preferred embodiment of the present invention is shown that includes a sun visor 10 comprised of a lightpipe assembly 20 and a visor assembly 30. Lightpipe assembly 20 comprises a lightpipe 22 flanked at each end with a lens 26. The central portion of lightpipe 22 has an opening 24 for intercepting and dispersing light within lightpipe 22. Visor assembly 30 comprises a trim bezel tray 32, a backplate 34, and a lamp/mirror lid 36. Trim bezel tray 32 has integrally molded portions 38 and 40 for intercepting lens 26 and mirror 28. A battery holder 42 and lamp socket 44 extends from trim bezel tray 32 and rests in an area over mirror 28.

Lightpipe assembly 20 is installed in visor assembly 30 by hingedly deploying backplate 34 from trim bezel tray 32 thereby exposing molded lens intercepting portions 38 along with battery holder 42 and lamp socket 44. Installation of lightpipe assembly 20 is accomplished when lenses 26 are snap-fitted into molded portions 38 and opening 24 of lightpipe 20 is placed over lamp socket 44. A replaceable battery 46 is placed within battery holder 42 and a bulb 48 is placed in lamp socket 44. Although the use of a bulb 48 is the preferred illumination source for lightpipe 22, it will be appreciated that the invention can be practiced with any desired illumination source, such as a light emitting diode (LED), and the like. Once the installation process is complete, backplate 34 is hingedly closed and secured to trim bezel tray 32. As described above, the lightpipe assembly eliminates wiring from the installation process and the replaceable battery eliminates a remote power source needed in conventional sun visors.

Once lightpipe assembly 20 is installed into visor assembly 30, use of mirror 28 within sun visor 10 with the capability of providing illumination to a user's face is possible. The user hingedly deploys sun visor 10 from a stored position against the ceiling of a vehicle (not shown) to a position where use of mirror 28 is possible. To gain access to mirror 28, lamp/mirror lid 36 is hingedly deployed away from mirror 28 and toward the ceiling of the vehicle. Once lamp/mirror lid 36 passes a critical angle in the deployment toward the ceiling, a switch (not shown) will close a circuit (not shown) in lamp socket 44 thereby causing bulb 48 to illuminate. Bulb 48 is positioned in lightpipe opening 24, thereby providing a source of illumination for lightpipe 22 to transmit. The illumination is transmitted from lightpipe 22 to lens 26 where the light is finally transmitted from inside visor assembly 30 and out to the user's face.

Figure 2:
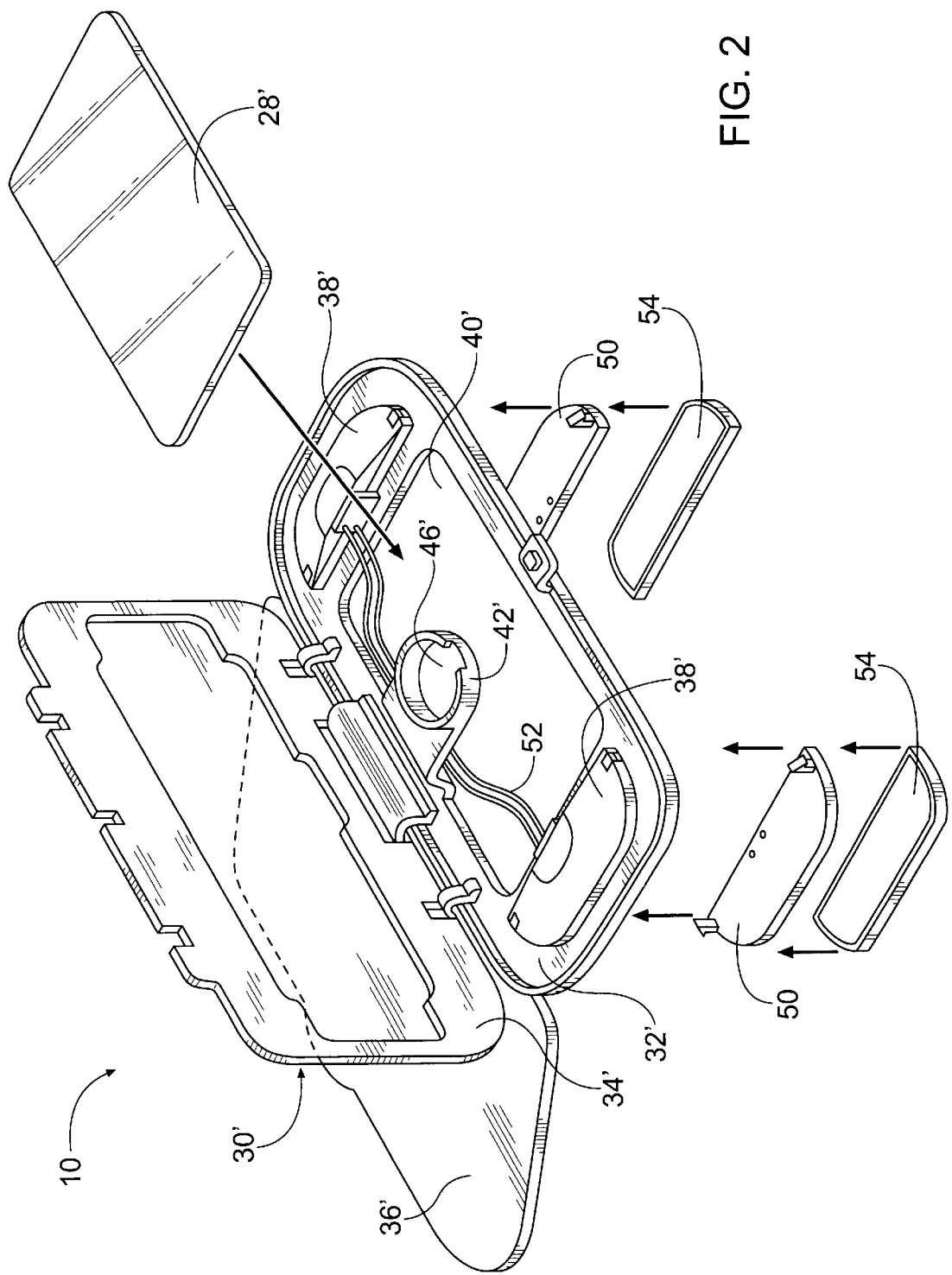
FIG. 2 is a transverse sectional view of a second embodiment of the present invention.

Referring to FIG. 2, another embodiment of the present invention is shown that includes a visor assembly 30' comprising a trim bezel tray 32', a backplate 34' and a lamp/mirror lid' 36'. Trim bezel tray 32' includes two integrally molded receiving portions 38' for receiving therein an illumination source 50, such as one of more light emitting diodes. Such diodes can be selected to provide a bright white light with minimal power draw or battery drain, and last for the life of the vehicle. Typically two diodes are associated with each tray 32'. A transmission lens 54 may be selected to protect illumination source 50 and to promote dispersion of light for the benefit of a user so that the entire face is equally illuminated. Trim bezel tray 32' further includes a molded portion 40' for intercepting a mirror 28'.

Illumination source 50 is attached to molded portions 38' such that each illumination source 50 faces the user when a lamp/mirror lid 36' is deployed. A battery holder 42' extends from bezel tray 32' and rests in an area over a mirror 28'. An electrical conductor 52, such as a pair of positive and negative electrically conductive wires, is provided between a battery 46' and each illumination source 50. In operation, once lamp/mirror lid 36' passes a critical angle in the deployment, a switch (not shown) will close a circuit (not shown) causing each illumination source 50 to illuminate. Alternatively, the switch may be a Reed Switch. As known to those skilled in the art, a Reed Switch includes two magnetic contacts in a glass tube filled with a protective gas. When a magnet within lid 36' comes close to the Reed Switch secured to trim bezel tray 32', the two contacts become magnetized and attracted to each other. When the magnet is removed, the contacts demagnetize, separate, and move to their original position. The contacts selectively open and close the lighting circuit as they contact and separate from one another. Reed Switches are very reliable, lasting for billions of operations, and ideal for the low current environment of the present invention.

It will be appreciated that the invention is not limited to installation in an automobile sun visor. Alternatively, the invention may be positioned in other locations of an automobile for the convenience of the occupants. For example, the invention may be installed in the back of a driver's seat or passenger's seat for use by the rear seat occupants.

While the invention has been specifically described in connection with certain specific embodiments thereof, it is to be understood that this is by way of illustration and not of limitation, and the scope of the appended claims should be construed as broadly as the prior art will permit.

What is claimed is:

1. A lamp assembly for a vehicle sun visor, comprising:

a lightpipe assembly including a lightpipe flanked at each end by an illumination transmitter, said lightpipe having an opening in a central portion thereof;

a visor assembly including a trim bezel tray, a backplate hingedly attached to said trim bezel tray, and a lamp/mirror lid hingedly attached to said trim bezel tray;

an illumination source positioned within said opening of said lightpipe; and a removable power source electrically connected to said illumination source to activate said illumination source.

2. The vanity lamp of claim 1, wherein said trim bezel tray includes a molded portion for intercepting each illumination transmitter.

3. The vanity lamp of claim 1, wherein said trim bezel tray includes means for receiving said opening of said lightpipe.

4. The vanity lamp of claim 1, wherein said trim bezel tray includes means for receiving said removable power source.

5. The vanity lamp of claim 1, wherein said illumination transmitters are lenses.

6. The vanity lamp of claim 1, wherein said illumination source is a light bulb.

7. The vanity lamp of claim 1, wherein said removable power source is a battery.

8. The vanity lamp of claim 1, further including a mirror mounted to said trim bezel tray.

9. A vanity lamp for use in a visor of a passenger vehicle, comprising:

a trim bezel tray including a selectively operable illumination device electrically connected to a local power source separate from the vehicle power source, said trim bezel tray further including at least one receiving portion and wherein said illumination device includes a lightpipe having an opening in a central portion thereof;

a mirror mounted to said trim bezel tray; and a mirror lid hingedly attached to said trim bezel tray.

10. The vanity lamp of claim 1, wherein said illumination device further includes an illumination source positioned within said opening of said lightpipe.

11. The vanity lamp of claim 10, wherein said illumination source is a light bulb.

12. The vanity lamp of claim 10, wherein said illumination source is a light emitting diode.

13. The vanity lamp of claim 9, wherein said removable power source is a battery.

14. The vanity lamp of claim 9, wherein said illumination device includes at least one illumination source positioned within said receiving portion.

15. The vanity lamp of claim 14, wherein said illumination source is one or more light emitting diodes.

16. The vanity lamp of claim 14 further including at least one transmission lens positioned over said illumination source to protect said illumination source and to promote dispersion of the light.

17. The vanity lamp of claim 9 wherein said local power source is replaceable.

* * * * *

UNITED STATES PATENT AND TRADEMARK OFFICE
CERTIFICATE OF CORRECTION

PATENT NO. : 6,499,868 B1
DATED : December 31, 2002
INVENTOR(S) : Joseph A. Kerul, Jr.

It is certified that error appears in the above-identified patent and that said Letters Patent is hereby corrected as shown below:

Column 4,
Line 41, change "claim 1" to -- claim 9 --.

Signed and Sealed this

Nineteenth Day of August, 2003

JAMES E. ROGAN
*Director of the United States Patent and Trademark Office*